(12) United States Patent
Fukuhara et al.

(10) Patent No.: US 7,021,139 B2
(45) Date of Patent: Apr. 4, 2006

(54) NON-CONTACT TYPE LIQUID LEVEL SENSOR

(75) Inventors: Toshiaki Fukuhara, Shimada (JP); Yukio Takahashi, Shimada (JP)

(73) Assignee: Yazaki Corporation, Tokyo (JP)

( * ) Notice: Subject to any disclaimer, the term of this patent is extended or adjusted under 35 U.S.C. 154(b) by 173 days.

(21) Appl. No.: 10/609,481

(22) Filed: Jul. 1, 2003

(65) Prior Publication Data

US 2004/0003660 A1 Jan. 8, 2004

(30) Foreign Application Priority Data

Jul. 2, 2002 (JP) .................................... P2002-193460

(51) Int. Cl.
*G01F 23/56* (2006.01)

(52) U.S. Cl. .......................... 73/319; 73/290 R; 73/317
(58) Field of Classification Search ............... 73/290 R, 73/319, 305, 317
See application file for complete search history.

(56) References Cited

U.S. PATENT DOCUMENTS 4,986,124 A * 1/1991 Byrne et al. .................. 73/317
2004/0016296 A1 * 1/2004 Weisse ......................... 73/314

FOREIGN PATENT DOCUMENTS

DE 19751210 A1 5/1999
WO WO 00/52425 9/2000

OTHER PUBLICATIONS

Journal of Technical Disclosure 2001–4678 issued by Japan Institute of Invention and Innovation.

* cited by examiner

*Primary Examiner*—Hezron Williams
*Assistant Examiner*—Rodney Frank
(74) *Attorney, Agent, or Firm*—Sughrue Mion, PLLC

(57) ABSTRACT

A non-contact type liquid level sensor includes a sensor housing; a rotary shaft, rotatably mounted on the sensor housing; a float, vertically movable with a change of a liquid level; a float arm, having a first end mounted on the float, and a second end coupled to the rotary shaft such that the rotary shaft is rotated with a vertical movement of the float; an annular magnet, coupled to the rotary shaft, and rotating together with the rotary shaft; a pair of arcuate stators, disposed in the sensor housing so as to confront an outer peripheral surface of the magnet; and a magnetoelectric transducing element, disposed between the first ends of the stators, for detecting a change of a magnetic flux density in the stators, which is caused by a turn of the magnet, and for converting the detected change of the magnetic flux density into an electrical signal. Second ends of the stators are spaced from each other to form a gap having an opening angle within a range from 50° to 200°.

3 Claims, 10 Drawing Sheets

NON-CONTACT TYPE LIQUID LEVEL SENSOR

BACKGROUND OF THE INVENTION

The present invention relates to a non-contact type liquid level sensor, and more particularly to a non-contact type liquid level sensor in which assembling of the liquid level sensor to a liquid storing tank is considerably improved by reducing the size of the liquid level sensor.

In the related non-contact type liquid level sensor, a detector is constructed with a resistor plate and a movable contact abutting on the resistor plate. When a float vertically moves with a change of a liquid level to be measured, the movable contact slides on and along the resistor plate to vary a resistance, and a liquid level is detected on the basis of a resistance change detected. In this type of the liquid level sensor, sometimes, the movable contact and the resistor plate are oxidized. Where those are oxidized, a variation of detected resistance value is extremely large or noise is generated. Thus, problem of detection accuracy to be solved is present.

To solve the problem of the liquid level sensor, a non-contact type liquid level sensor is proposed recently. The proposed liquid level sensor uses a magnetoelectric transducing element, which detects a change of magnetic force and converts the detected magnetic force into an electrical signal. The non-contact type liquid level sensor is disclosed in the journal of technical disclosure No. 2001-4678, issued by Japan Institute of Invention and Innovation.

An example of a related non-contact type liquid level sensor will be described with reference to FIGS. 13 to 15. FIG. 13 is a longitudinal sectional view showing a related non-contact type liquid level sensor 1, FIG. 14 is a perspective view showing a positional relationship among a magnetoelectric transducing element 11, a magnet 5, and a stator 9, which are extracted from FIG. 13, and FIG. 15 is an enlarged, longitudinal sectional view showing a structure when a magnet chamber cover 14 is mounted in a magnet chamber 2a.

As shown in FIG. 13, the related non-contact type liquid level sensor 1 is arranged such that a sensor housing 2 made of synthetic resin is fixed to within a vehicle fuel tank 3. A rotary shaft 4 is rotatably disposed within a magnet chamber 2a formed within the sensor housing 2. A sintered magnet 5 is fit to an outer peripheral surface of the rotary shaft 4. The sintered magnet 5 is fastened to the rotary shaft 4 by fixing member, such as bonding or engagement.

The sintered magnet 5, for example, a ferrite magnet, is formed in a manner that magnetic powder is molded into an annular shape, and sintered, and then the resultant is radially magnetized to have two magnetic poles. As shown in FIG. 15, a magnet chamber cover 14 made of synthetic resin is fixed to an opening part of a magnet chamber 2a in a manner that pawls 2b formed in the sensor housing 2 are fit into locking holes 14a formed in the magnet chamber cover 14. A support hole 14b is formed in the magnet chamber cover 14. One end of the rotary shaft 4 is inserted into the support hole 14b and rotatably supported by the support hole.

As shown in FIG. 13, one end of a float arm 6 is mounted on a float 8, and the other end thereof is fastened to the rotary shaft 4. When the float 8 vertically moves with a change of a liquid level 15, a vertical movement of the float is transmitted through the float arm 6 to the rotary shaft 4 which in turn rotates.

As shown in FIG. 14, a couple of semicircular stators 9 are circularly arranged around the sintered magnet 5, while being confronted with an outer peripheral surface of the sintered magnet 5. A gap 10 is present between the first ends of the coupled stators 9, and another gap 10 is present between the second ends of the same. A phase difference of 180° is present between those gaps. A magnetoelectric transducing element 11, such as a Hall element or a Hall IC, is placed in one of the gaps, while being put between the coupled stators. Terminals 11a of the magnetoelectric transducing element 11 are electrically connected to a wiring board 12, which is electrically connected to a terminal 13.

When the float 8 vertically moves with a change of the liquid level 15, the rotary shaft 4 turns together with the sintered magnet 5. With the turn of the sintered magnet 5, a magnetic flux density passing through the magnetoelectric transducing element 11 changes. The magnetoelectric transducing element 11 detects a change of the magnetic flux density and converts the magnetic flux density change into an electrical signal.

The non-contact type liquid level sensor 1 has such a structure that a couple of semicircular stators 9, while being circularly arranged, are confronted with an outer peripheral surface of the annular sintered magnet 5. With presence of the circularly arranged stators 9, there is a limit in reducing the size of the non-contact type liquid level sensor 1. In particular, the non-contact type liquid level sensor 1 is frequently mounted onto a small reserve cup attached to the inside of a vehicle fuel tank 3. From the point of view of the assembling work improvement and securing a space of the vehicle fuel tank 3, how to reduce the size of the non-contact type liquid level sensor 1 is an important problem.

SUMMARY OF THE INVENTION

It is therefore an object of the present invention to provide a non-contact type liquid level sensor which is easily assembled to a liquid storing tank, such as a vehicle fuel tank, by reducing the size of the sensor, and secures a larger liquid storing space within the liquid storing tank.

In order to achieve the above object, according to the present invention, there is provided a non-contact type liquid level sensor comprising:

a sensor housing;

a rotary shaft, rotatably mounted on the sensor housing;

a float, vertically movable with a change of a liquid level;

a float arm, having a first end mounted on the float, and a second end coupled to the rotary shaft such that the rotary shaft is rotated with a vertical movement of the float;

an annular magnet, coupled to the rotary shaft, and rotating together with the rotary shaft;

a pair of arcuate stators, disposed in the sensor housing so as to confront an outer peripheral surface of the magnet; and a magnetoelectric transducing element, disposed between the first ends of the stators, for detecting a change of a magnetic flux density in the stators, which is caused by a turn of the magnet, and for converting the detected change of the magnetic flux density into an electrical signal, wherein second ends of the stators are spaced from each other to form a gap having an opening angle within a range from 50° to 200°.

In the invention, the non-contact type liquid level sensor includes a couple of arcuate stators being disposed within the sensor housing while being confronted with an outer peripheral surface of the magnet, and a magnetoelectric transducing element, put between the first ends of the stators, for detecting a change of a magnetic flux density in the stators, which is caused by a turn of the magnet, and for converting the detected change of the magnetic flux density into an electrical signal. The second ends of the stators are spaced from each other to form a gap having an opening angle within a range from 50° to 200°. The stators are configured to be arcuate, and the arc length of each stator is shorter than that of a related semicircular stator. The whole array of stators when those are disposed in the sensor housing is configured to be a circle as cut out. Therefore, if a configuration of the sensor housing is appropriately altered in conformity with the stator array configuration, the size reduction of the non-contact type liquid level sensor is possible. With such a construction, the non-contact type liquid level sensor is easily assembled to a liquid storing tank, and additionally a larger liquid storing space within the liquid storing tank is secured.

Preferably, the arc lengths of the pair of stators are different from each other.

In this configuration, the arc lengths of the couple of stators are different from each other. In other words, the couple of stators are arranged asymmetrically with respect to a lin conn cting the center of the magnet and the center of the magnetoelectric transducing element. With this feature, the float arm is simplified in shape. In the float arm, there is no need of forming a part protruding in the width direction of the non-contact type liquid level sensor 20. As a result, the non-contact type liquid level sensor is reduced in size, and hence, it is easy to insert the float arm into the fuel tank and to assemble it to the same. The number of bending steps is reduced, so that the float arm is manufactured at low cost.

Preferably, the opening angle of the gap is within a range from 90° to 180°.

In this configuration, the opening angle of the gap is within a range from 90° to 180°, which is narrower than the angular range from 50° to 200°. When the opening angle is 90°, the flux density detected by the magnetoelectric transducing element exhibits a maximum value. Therefore, even if the magnetic force of the magnet 23 is weakened by that amount, the performance of the detector comparable with that of the related detector is secured. When the opening angle is 180°, the sensor performance on the magnetic flux density detected by the magnetoelectric transducing element is comparable with that of the related sensor. Accordingly, the size of the sensor is efficiently reduced. In other words, 90° of the opening angle of the gap G is the most advantageous in the light of the magnetic force, and 180° of the opening angle of the gap G is advantageous in the size reduction of the sensor.

BRIEF DESCRIPTION OF THE DRAWINGS

The above objects and advantages of the present invention will become more apparent by describing in detail preferred exemplary embodiments thereof with reference to the accompanying drawings, wherein:

FIG. 15 is an enlarged, longitudinal sectional view showing a structure when a magnet chamber cover 14 is mounted in a magnet chamber 2a.

DETAILED DESCRIPTION OF THE PREFERRED EMBODIMENTS

The summary of the invention is as described above. The advantages, features and others of the invention will more clearly be understood when carefully reading the following detailed description in connection with the accompanying drawings.

The preferred embodiments of the present invention will be described with reference to the accompanying drawings.

Figure 1:
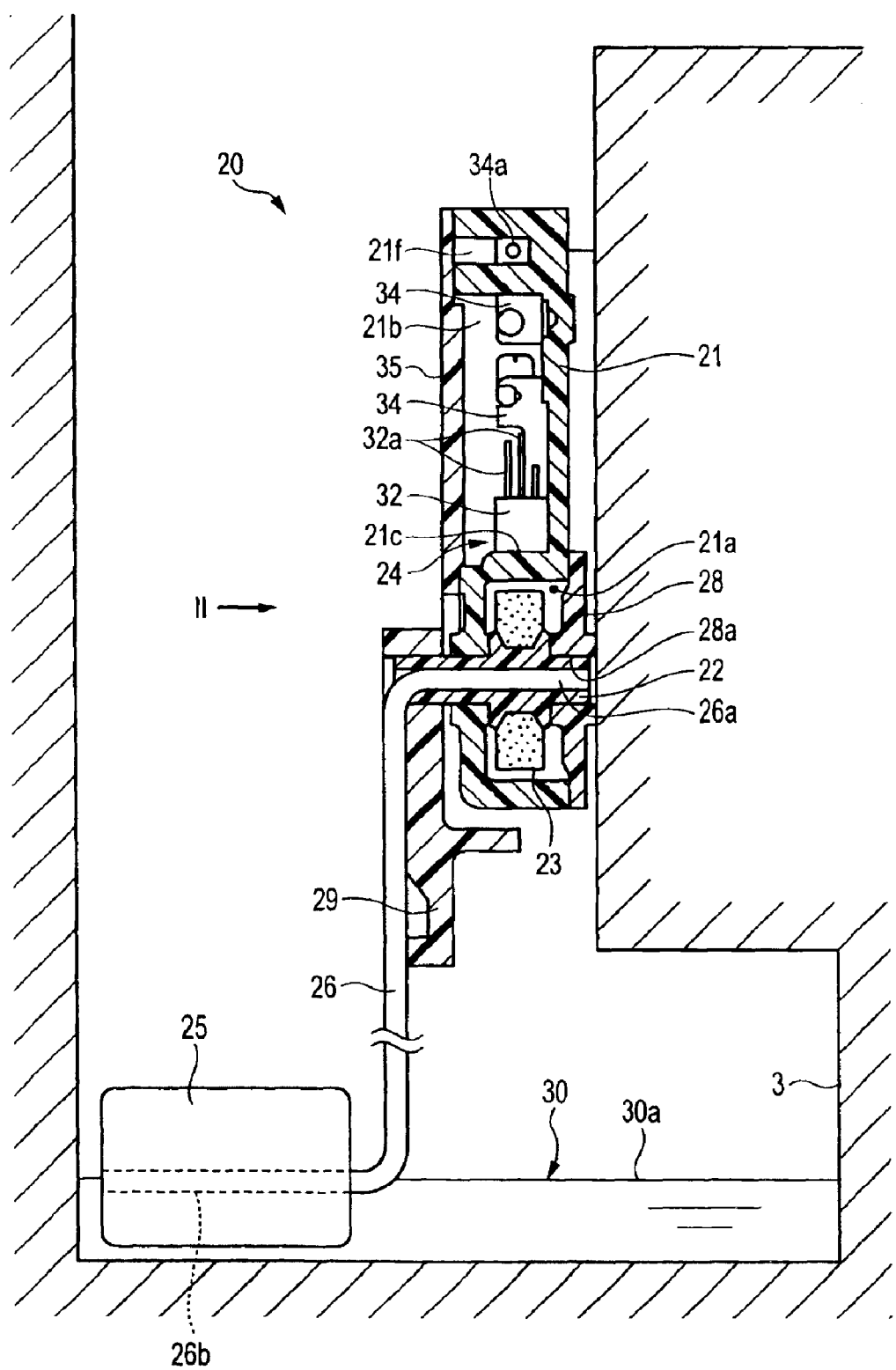
FIG. 1 is a longitudinal sectional view showing a non-contact type liquid level sensor according to the present invention.
Figure 2:
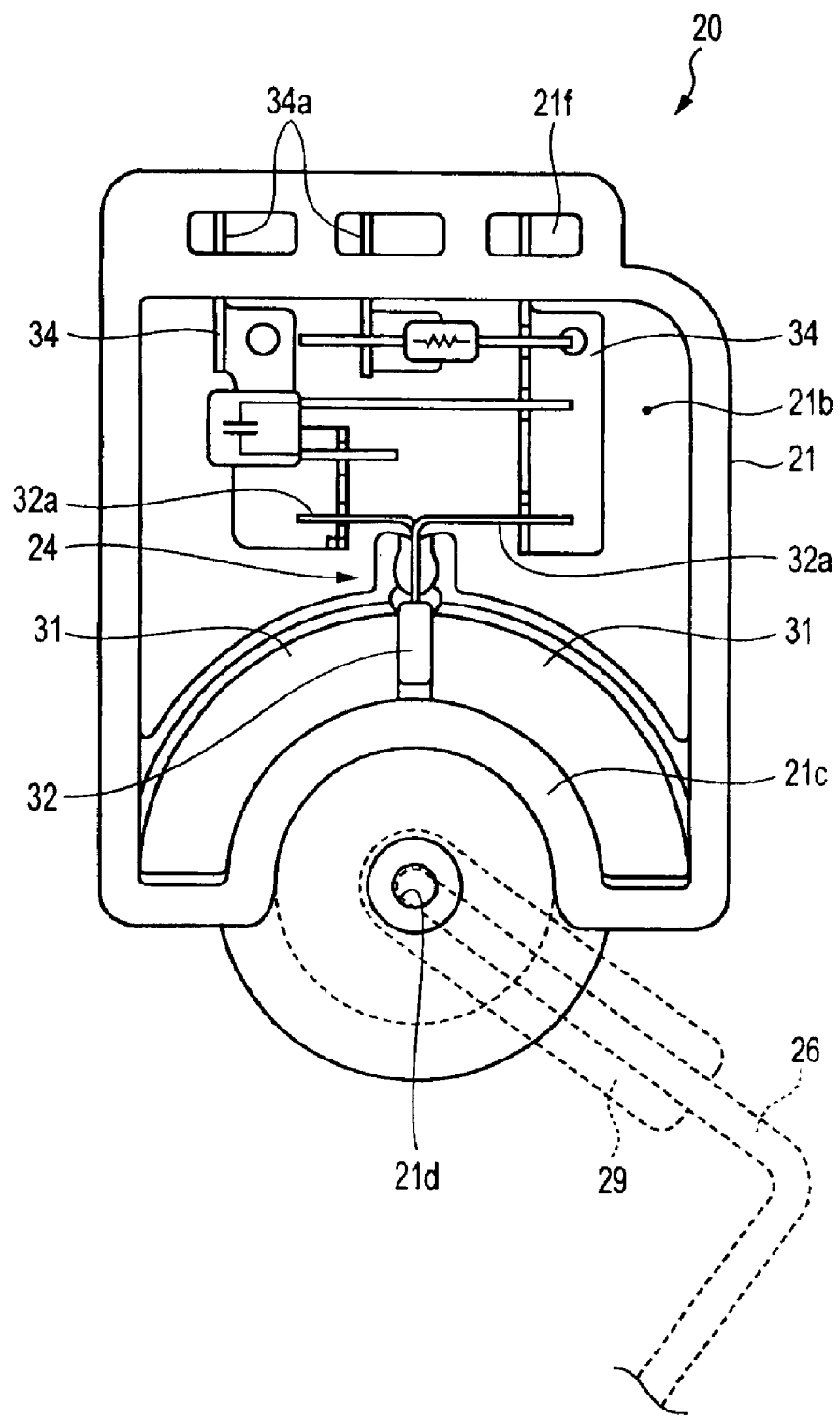
FIG. 2 is a view showing the non-contact type liquid level sensor when it is uncovered, when viewed in a direction of an arrow II in FIG. 1.
Figure 3:
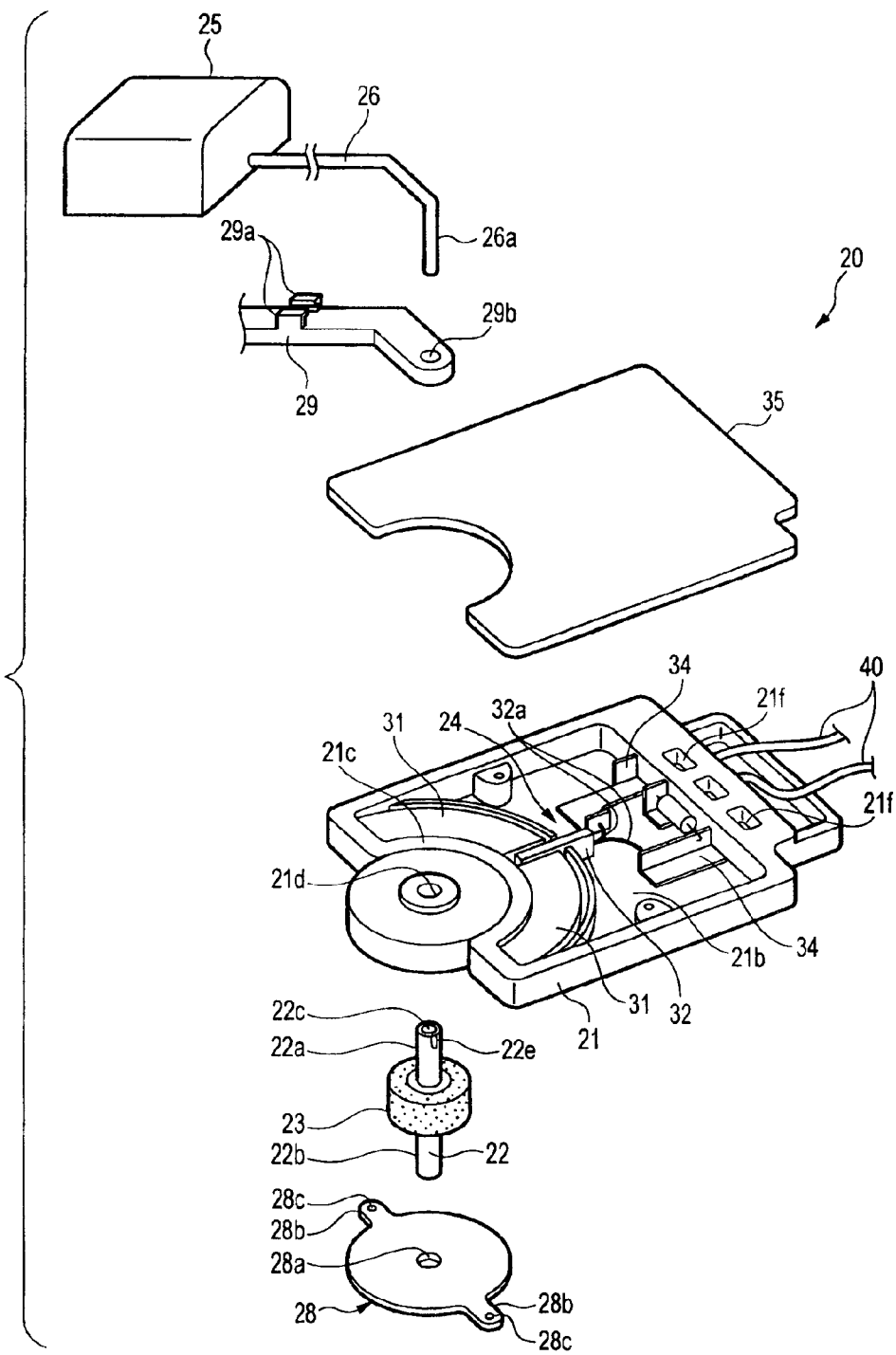
FIG. 3 is an exploded, perspective view showing the non-contact type liquid level sensor.
Figure 4:
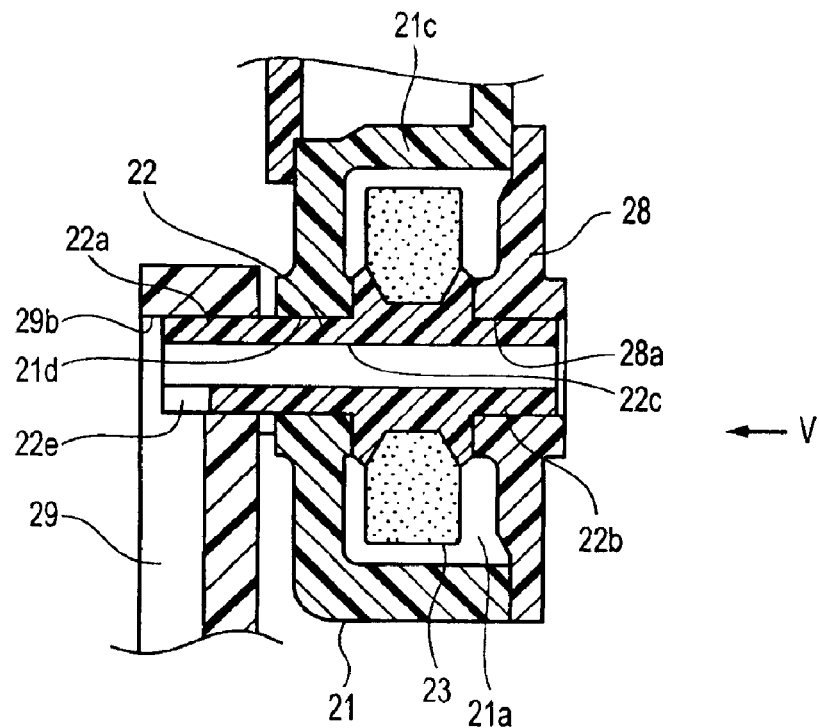
FIG. 4 is an enlarged, longitudinal sectional view showing a structure of the liquid level sensor shown in FIG. 1, which includes mainly a rotary shaft that is rotatably supported by a sensor housing and a magnet chamber cover.
Figure 5:
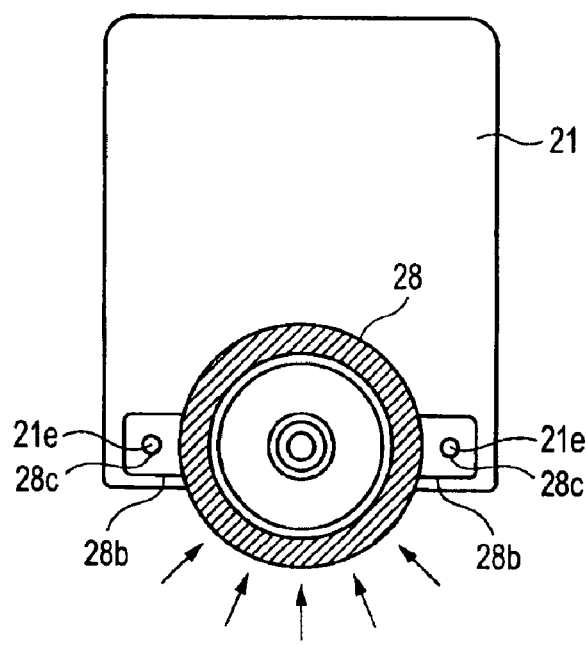
FIG. 5 is a view showing a state that the magnet chamber cover is welded onto the magnet chamber, when viewed in a direction of an arrow V in FIG. 4.
Figure 6:
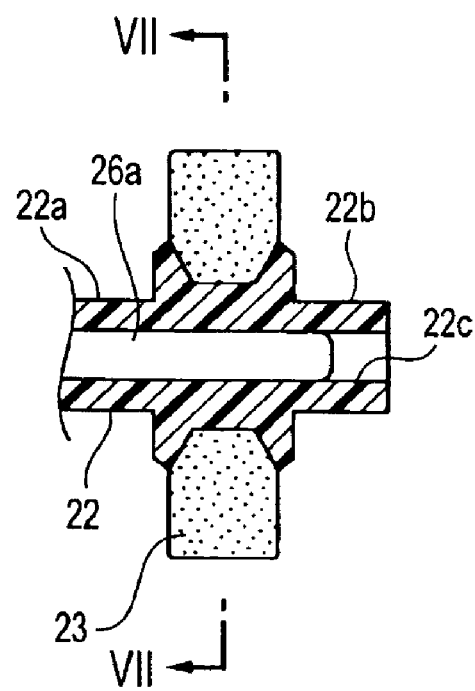
FIG. 6 is a cross sectional view showing a key portion of a magnet integrally molded onto the rotary shaft.
Figure 7:
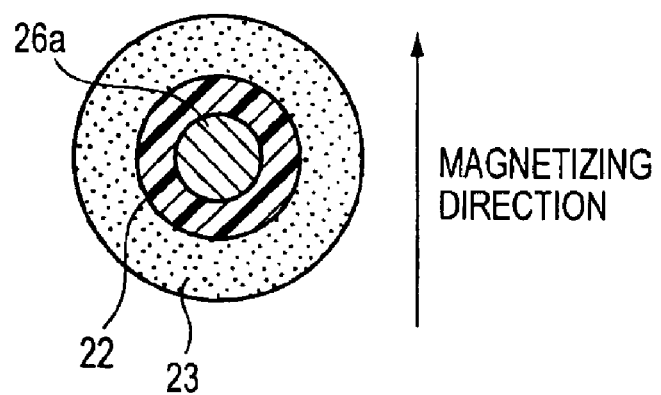
FIG. 7 is a longitudinal sectional view taken on line VII—VII in FIG. 6.
Figure 8:
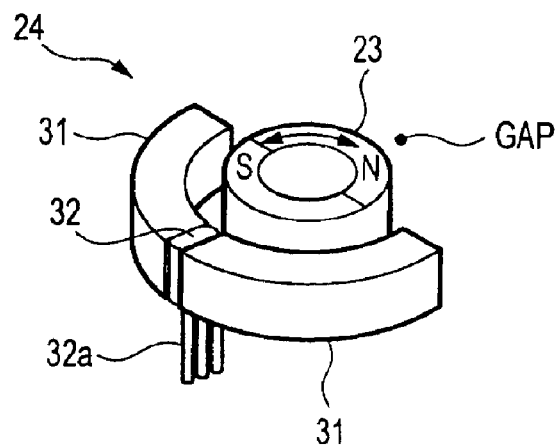
FIG. 8 is a perspective view showing a structure including the magnetoelectric transducing element, the magnet and the stator.

FIG. 1 is a longitudinal sectional view showing a non-contact type liquid level sensor according to the present invention. FIG. 2 is a view showing the non-contact type liquid level sensor when it is uncovered, when viewed in a direction of an arrow II in FIG. 1. FIG. 3 is an exploded, perspective view showing the non-contact type liquid level sensor. FIG. 4 is an enlarged, longitudinal sectional view showing a structure of the liquid level sensor shown in FIG. 1, which includes mainly a rotary shaft that is rotatably supported by a sensor housing and a magnet chamber cover. FIG. 5 is a view showing a state that the magnet chamber cover is welded onto the magnet chamber, when viewed in a direction of an arrow V in FIG. 4. FIG. 6 is a cross sectional view showing a key portion of a magnet integrally molded onto the rotary shaft. FIG. 7 is a longitudinal sectional view taken on line VII—VII in FIG. 6. FIG. 8 is a perspective view showing a structure including the magnetoelectric transducing element, the magnet and the stator.

As shown in FIGS. 1 to 3, a non-contact type liquid level sensor 20 according to the invention includes a sensor housing 21, a rotary shaft 22, a magnet 23, a detector 24, a float 25, and a float arm 26. The sensor housing 21 is formed by injection molding synthetic resin. The non-contact type liquid level sensor 20 is arranged such that a sensor housing 21 is fixed to within a vehicle fuel tank 3. A magnet chamber 21a, which is defined by a receding part shaped like a fore-tooth in cross section, is provided at one end of the sensor housing 21. A detector container chamber 21b, which is defined by a receding part shaped like a rectangle in cross section, has an opening surface opposed to an opening surface of the magnet chamber 21a. The detector container chamber 21b is partitioned from the magnet chamber 21a by a semicircular partitioning wall 21c.

As shown in FIG. 4, a first shaft part 22a of the rotary shaft 22 is inserted into a support hole 21d formed at a central part of the magnet chamber 21a. The opening surface of the magnet chamber 21a is covered with a magnet chamber cover 28 made of synthetic resin. A second shaft part 22b of the rotary shaft 22 is inserted into a support hole 28a formed at a central part of the magnet chamber cover 28. The support hole cooperates with the support hole 21d of the magnet chamber 21a to rotatably support the rotary shaft 22.

As shown in FIG. 5, the magnet chamber cover 28 is a plate like cover which is made of synthetic resin and includes protruded parts 28b with positioning holes 28c, which are protruded to both sides. To mount the magnet chamber onto the sensor housing 21, protruded pins 21e of the sensor housing 21 are fit into the positioning holes 28c of the magnet chamber cover, and the magnet chamber cover is entirely welded to the sensor housing 21, as hatched in FIG. 5. Accordingly, the magnet chamber 21a is tightly sealed.

Examples of welding methods available here are vibration, ultrasonic, and laser welding methods. If the vibration welding method is used, the magnet chamber cover 28 is vibrated in a direction parallel to the welding surface. Accordingly, use of the vibration welding makes it difficult to use a structure to engage the protruded pins 21e with the positioning holes 28c for positioning. Therefore, it is difficult to weld the magnet chamber cover 28 to the sensor housing 21 in a state that the support hole 21d of the magnet chamber 21a is axially aligned with the support hole 28a of the magnet chamber cover 28. If the weld the magnet chamber cover 28 is welded to the sensor housing 21 in a state that the support hole 21d is offset from the support hole 28a in their axial alignment, a rotational torque of the rotary shaft 22 is high. The high torque will possibly have some affect on a detection accuracy.

In this respect, among other welding methods, the ultrasonic or the laser welding method is preferably used for such a purpose. In the case of the laser welding method, it is preferable that the member (e.g., the magnet chamber cover 28) which is irradiated with laser beam, is transparent or translucent so as to permit the laser beam to pass therethrough. The remaining member (e.g., the sensor housing 21) is preferably black to increase an absorption efficiency of the laser beam.

As shown in FIG. 4, the rotary shaft 22 is provided for supporting and rotating the magnet 23. A positioning recess 22e is formed in the first shaft part 22a of the rotary shaft 22. Incidentally, the magnet 23 is integrally molded on and fixed to the outer peripheral surface of the rotary shaft 22. The rotary shaft 22 has a through hole 22c extending through the central part of the shaft. The float arm 26 is inserted into the through hole 22c.

The first shaft part 22a of the rotary shaft, which is protruded from the support hole 21d of the magnet chamber 21a, is inserted into a hole 29b formed at one end of an arm holder 29. An inner side of a bent part of the float arm 26, which is located near the hole 29b of the non-contact type liquid level sensor 20 is engaged with the positioning recess 22e of the rotary shaft 22. A mounting angle between the arm holder 29 and the rotary shaft 22 is set a constant.

A first end 26a of the metal float arm 26 bent like L is inserted into the through hole 22c of the rotary shaft 22. As shown in FIG. 3, the float arm 26 is held with a couple of pawls 29a of the arm holder 29 and is swingable together with the arm holder 29. A second end 26b of the float arm 26 is mounted on the float 25 (see FIG. 1).

In the non-contact type liquid level sensor 20 thus constructed, when a fuel 30 stored in the vehicle fuel tank 3 shown in FIG. 1 changes in amount and a liquid level 30a of the fuel changes, the float 25 vertically moves with the liquid level change. With the vertical movement of the float 25, the magnet 23 is rotated together with the rotary shaft 22.

As shown in FIGS. 6 and 7, the magnet 23 is a plastic magnet molded by using a composite material containing PPS (polyphenylene sulfide) resin and neodyminum magnetic powder. The magnet 23 is integrally molded on the outer peripheral surface of the rotary shaft 22. After the magnet 23 is integrally molded on the rotary shaft 22, the resultant magnet is magnetized in a radial direction (direction of an arrow in FIG. 7) while being held with a holding jig or the like (not shown) to have two poles as shown in FIG. 8. Since the magnet 23 is integrally molded on the rotary shaft 22 in a state that those are coaxially aligned with each other as shown in FIG. 7, the magnet 23 has no play and no eccentricity with respect to the rotary shaft 22, and hence, has a high precision. This leads to an increase of a detection accuracy of the non-contact type liquid level sensor 20.

The detector 24 is provided or detecting a magnetic flux density. As shown in FIGS. 2, 3 and 8, the detector includes the stators 31 and a magnetoelectric transducing element 32, such as a Hall element or a Hall IC, and is located in the detector container chamber 21b. The stators 31 is an arcuate plate made of a magnetic material. A couple of stators 31 are confronted with the outer peripheral surface of the magnet 23, and form a semicircle coaxial with the magnet 23. Examples of the magnetic materials for the stators 31 are silicon steel, iron, martensitic stainless steel, and ferite stainless steel.

Each stator 31 has an arcuate shape as of a quarter circle. The magnetoelectric transducing element 32 is put between first ends (first end faces) of the stators 31. Accordingly, second ends (other ends) of the stators 31 are separated apart from each other to form a gap G defined by an opening angle of about 180°.

As shown in FIG. 2, for example, a terminal 32a of the magnetoelectric transducing element 32 is electrically connected to a terminal 34 provided in the detector container chamber 21b. One end 34a of the terminal 34 is led to an external output terminal 21f provided outside the detector container chamber 21b, and electrically connected to an electric wire 40. A detect signal produced by the magnetoelectric transducing element 32 is led to outside the non-contact type liquid level sensor 20 via the electric wire 40. As shown in FIGS. 1 and 3, the detector container chamber 21b is covered with a cover 35.

Figure 9:
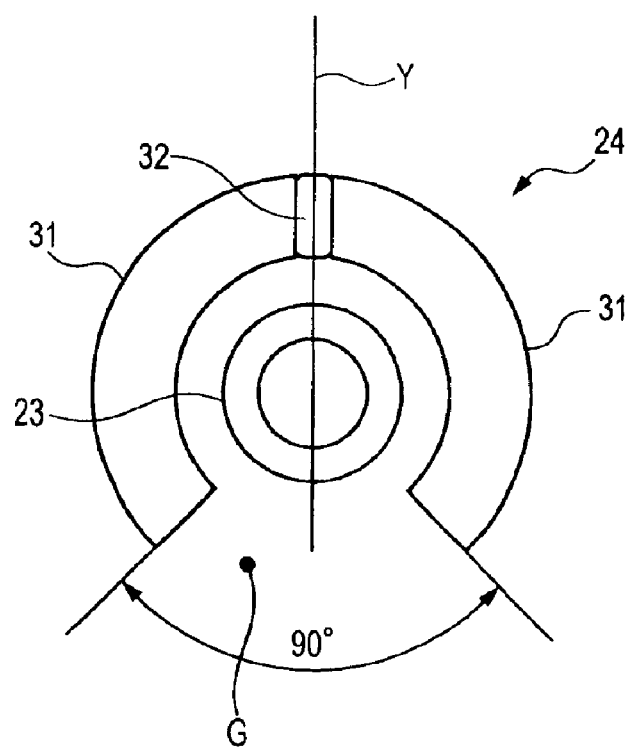
FIG. 9 is a plan view showing a modification of a detector in which an opening angle of a gap, which is defined by the second ends of stators, is about 90° and the stators are symmetrically disposed.

A second embodiment of the detector 24 will be described with reference to FIG. 9. FIG. 9 is a plan view showing a detector in which an opening angle of a gap G, which is defined by the second ends of stators 31, is about 90° and the stators 31 are symmetrically disposed. As shown in FIG. 9, in the second embodiment, each stator 31 has an arc shape defined by an angle of about 135°. In other words, the two stators 31 are formed such that their arc lengths are substantially equal to each other. The couple of the stators 31 are disposed such that the magnetoelectric transducing element 32 is placed between the first ends of those detectors 24, as in the case of the detector 24 in FIG. 8. An opening angle of the gap G defined by the second ends of the stators 31 is about 90°. The gap G is symmetrical in shape with respect to a straight line Y connecting the center of the magnet 23 (i.e., the axial center of the rotary shaft 22) and the center of the magnetoelectric transducing element 32. In other words, the coupled stators 31 is shaped to be symmetrical with respect to a line connecting the center of the magnet 23 and the center of the magnetoelectric transducing element 32. When the second embodiment of the detector 24, which is shown in FIG. 9, is used, what a designer has to do is to appropriately modify the sensor housing 21 and the like so as to accept the modification.

Figure 10:
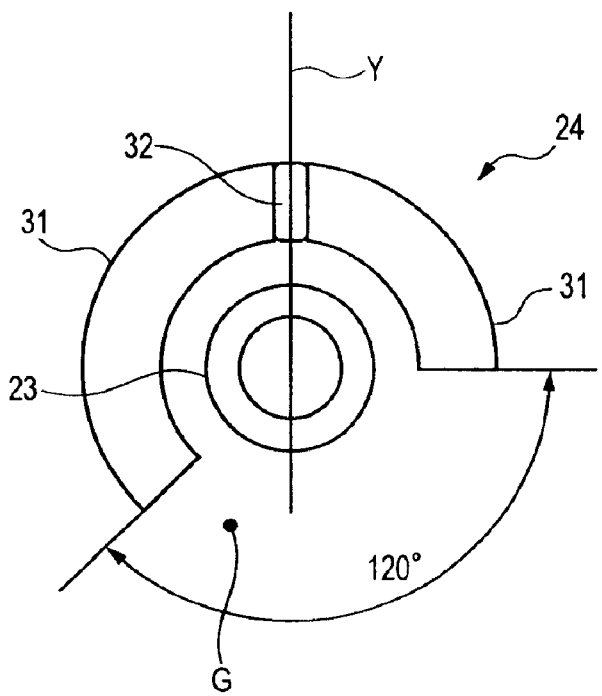
FIG. 10 is a plan view showing another modification of a detector in which an opening angle of a gap, which is defined by the second ends of stators, is about 120° and the stators are asymmetrically disposed.

A third embodiment of the invention will be described with reference to FIG. 10. FIG. 10 is a plan view showing the third embodiment in which an opening angle of a gap G, which is defined by the second ends of stators 31, is about 120° and the stators 31 are asymmetrically disposed. As shown in FIG. 10, in the embodiment, the stators 31 are different in shape: One of the stators 31 has an arc shape defined by about 90°, and the other has an arc shape defined by about 150°. In other words, the two stators 31 are different in their arc length. Those coupled stators 31 are disposed such that the magnetoelectric transducing element 32 is placed between the first ends of those stators, as in the case of the detector 24 of FIG. 8. Accordingly, an opening angle of the gap G, defined by the second ends of the stators, is about 120°. The gap G is disposed asymmetrically with respect to a straight line Y connecting the center of th rotary shaft 22 (i.e., the axial center of the rotary shaft 22) and the center of the magnetoelectric transducing element 32. In other words, the coupled stators 31 is shaped to be asymmetrical with respect to the center of the magnet 23 and the center o the magnetoelectric transducing element 32. When this embodiment, which is shown in FIG. 10, is used, what a designer has to do is to appropriately modify the sensor housing 21 and the like so as to accept the modification.

Figure 11:
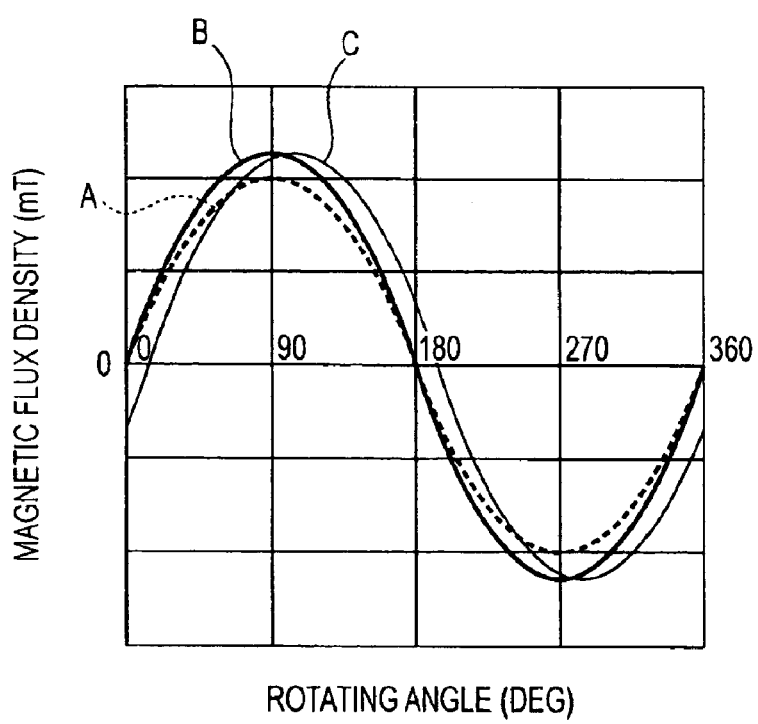
FIG. 11 is a graph showing a variation of a flux density detected by the magnetoelectric transducing element with respect to a rotational angle of the magnet in a case where the couple of stators are configured to be circular.

FIG. 11 is a graph showing a variation of a flux density detected by the magnetoelectric transducing element 32 with respect to a rotational angle of the magnet 23 in a case where the couple of stators 31 are configured to be circular. A characteristic curve A represents a characteristic of the detector in which the coupled stators 31 (cooperate with the magnetoelectric transducing element 32) forms a circle, like the stators 9 of the related non-contact type liquid level sensor 1. As indicated by the characteristic curve A, the flux density varies while depicting a sine curve in which the flux density is zero at 0°, 180° and 360° of the rotational angles of the magnet 23. The non-contact type liquid level sensor 20 requires linearity in the characteristic thereof. Therefore, an angular range from, for example, 130° to 230° (180°±50°) of the rotational angle, is used.

A characteristic curve B represents a characteristic of the detector 24 modified as shown in FIG. 9. As in the characteristic curve A, the flux density varies while depicting a sine curve in which the flux density is zero at phases 0°, 180° and 360° of the rotational angles of the magnet 23. As seen, an amplitude or flux density of the characteristic curve B is larger than that of the characteristic curve A, however. This fact implies that a magnetic force of the magnet 23 may be weakened so as to produce a magnetic flux density comparable with the magnetic flux density indicated by the characteristic curve A (=magnetic flux density detected by the magnetoelectric transducing element 32 in the detector where the couple of stators 31 form (cooperate with the magnetoelectric transducing element 32, like the stators 9 of the related non-contact type liquid level sensor 1). This is an advantageous feature when considering the cost of manufacturing the magnet 23.

A characteristic curve C represents a characteristic of the detector 24 modified as shown in FIG. 10. As seen, a magnetic flux density of the characteristic curve C is larger than that of the characteristic curve A, but is somewhat smaller than that of the characteristic curve B. The characteristic curve C is phase shifted to a positive direction (i.e., a phase advancing direction) since the gap G is asymmetrically configured. This phase shift presents no problem in practical use since the magnetoelectric transducing element 32 contains a semiconductor memory (not shown), such as an EEPROM (i.e., electrically erasable programmable read-only memory) which prestores phase correction data, and a semiconductor operation element (not shown) for correcting a phase shift of the magnetic flux density according to the phase correction data stored, such as a CPU (central processing unit), and automatically corrects the phase shift. As readily seen, in the invention, it is not essential that the magnetoelectric transducing element 32 contains the semiconductor memory and the semiconductor operation element. In an alternative, the phase correction member containing the semiconductor memory and the semiconductor operation element is provided separately from the non-contact type liquid level sensor 20. The magnetoelectric transducing element 32 detects only the magnetic flux density. A detect signal output from the magnetoelectric transducing element 32 is led from the non-contact type liquid level sensor 20 to exterior by way of the electric wire 40. The phase correcting member separately provided receives the detect signal and corrects a phase shift based on the detect signal received.

A test was conducted. In the test, an opening angle of the gap G was variously changed. Magnitudes of magnetic flux densities detected by the magnetoelectric transducing element 32 were measured. When the opening angle is 90°, the magnetic flux density exhibited a maximum value. When the opening angle is larger than 90° and also when it is smaller than 90°, the magnetic flux density was small in value. When the opening angle of the gap G was 180°, the characteristic of the detector is the same as the characteristic curve A. This fact was confirmed by the test.

The test result shows that the opening angle of the gap G is 50° to 200°, preferably 90° to 180°. The reason why the opening angle is selected to be 50° or larger is to cover a minimum swing angle 55° of float 25. The reason why the opening angle is selected to be 200° or smaller is that if the opening angle of the gap G is large, the detector is apt to be influenced highly by an external magnetic force, and hence, the detector will receive noise highly possibly.

The reason why the opening angle is selected to be within the range from 90° to 180° follows. The magnetic flux density is maximized at 90° of the opening angle. Therefore, even if the magnetic force of the magnet 23 is weakened by that amount, the performance of the detector comparable with that of the related detector (i.e., as indicated by the characteristic curve A) is secured. The reason why 180° is selected is that the detector performance on the magnetic flux density, which is comparable with that of the related detector (i.e., as indicated by the characteristic curve A) is secured, and the size of the detector may efficiently be reduced. Thus, 90° of the opening angle of the gap G is the most advantageous in the light of the magnetic force, and 180° of the opening angle of the gap G is advantageous in the size reduction of the detector.

For the above reason, what a designer has to do is to select the opening angle of the gap G to be the most desirable value within 50° to 200° according to the specification of the non-contact type liquid level sensor 20.

Figure 12:
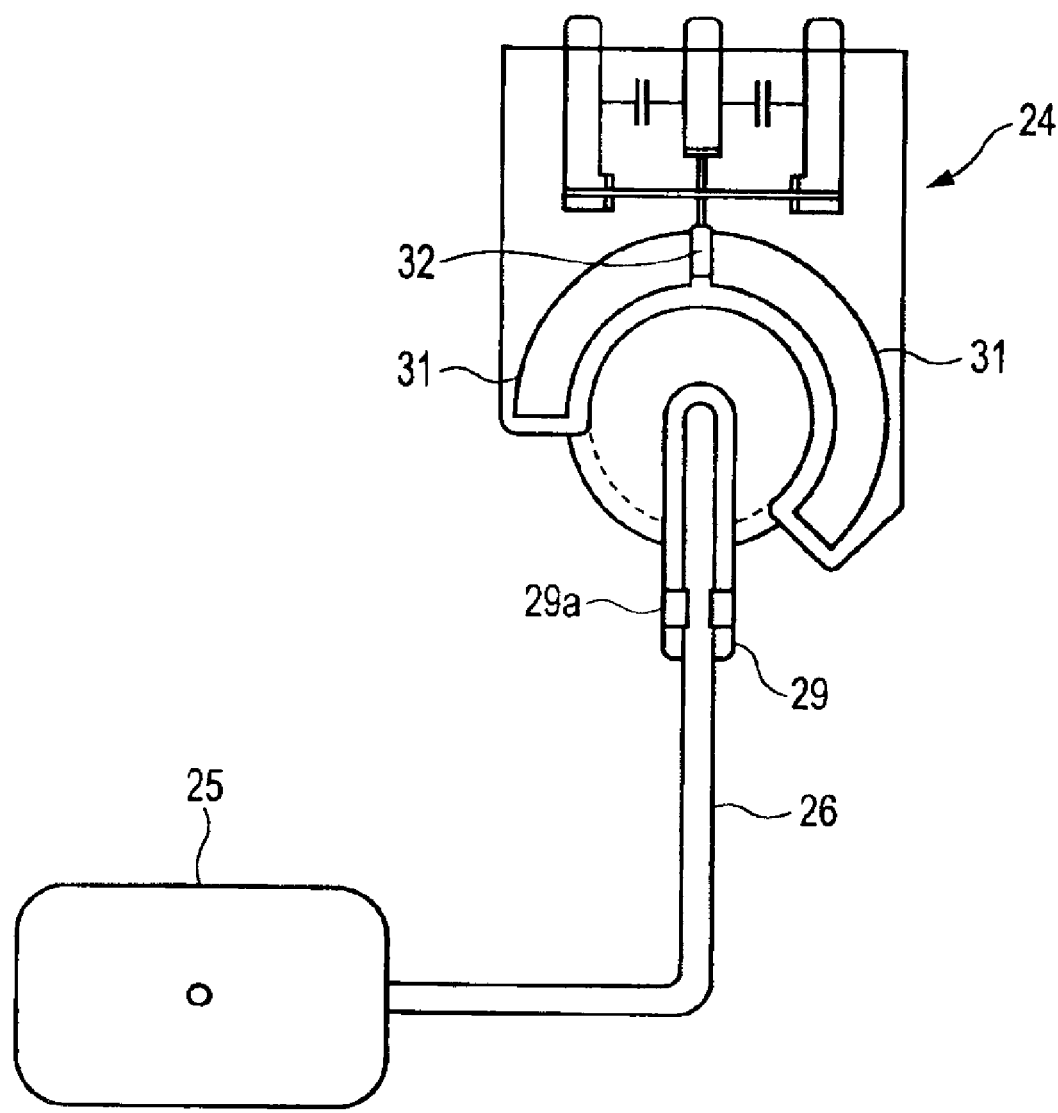
FIG. 12 is a front view showing a float arm whose shape is simplified by using the asymmetrically configured stators as in the modification of the detector shown in FIG. 10.
Figure 13:
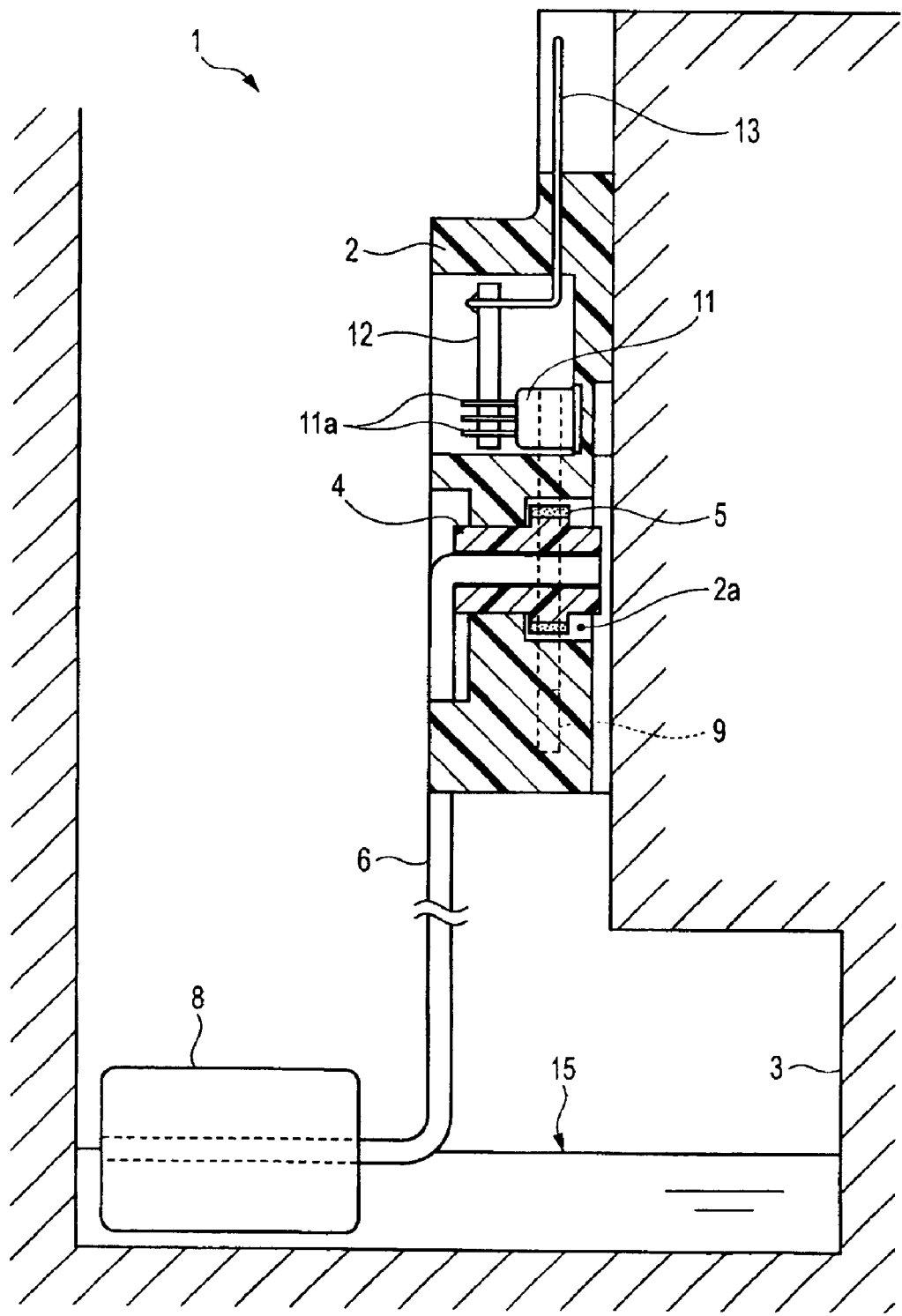
FIG. 13 is a longitudinal sectional view showing a related non-contact type liquid level sensor.
Figure 14:
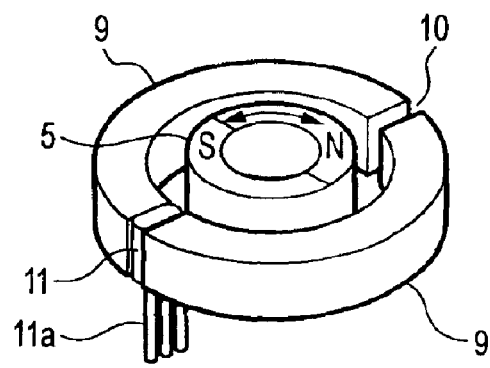
FIG. 14 is a perspective view showing a positional relationship among a magnetoelectric transducing element, a magnet, and a stator, which are extracted from FIG. 13.
Figure 15:
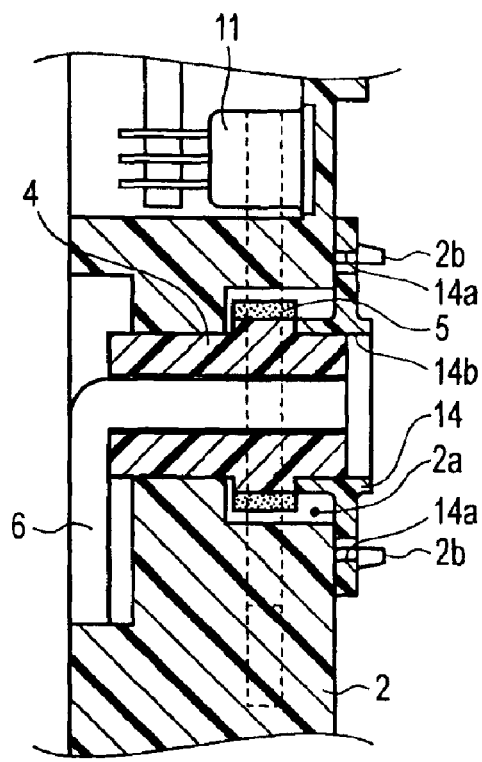

FIG. 12 is a front view showing a float arm whose shape is simplified by using the asymmetrically configured stators 31 as in the modification of the detector 24 shown in FIG. 10. When the detector 24 as shown in FIG. 12 is used, what one has to do is to extend the float arm 26 from the detector 24 to the liquid level 30a in a vertical direction, and then to bend the float arm to the float 25 substantially at a right angle. The result is to enable the float arm 26 to be simplified in shape, to reduce the number of bending steps, and to enable the float arm to be manufactured at low cost. The float arm 26 is configured to extend downward (to the liquid level 30a substantially in a vertical direction). When comparing with the float arm 26 as indicated by a dotted line in FIG. 2, in the float arm 26, there is no need of forming a part protruding in the width direction of the non-contact type liquid level sensor 20 (to the right in FIG. 12). As a result it is easy to insert the float arm into the fuel tank and to assemble it to the same.

Operations of the embodiment will be described.

In FIG. 1, the float 25 vertically moves with a change of the liquid level 30a. A movement (displacement) of the float 25 is transmitted to the rotary shaft 22 through the float arm 26, and turns the rotary shaft 22 together with the magnet 23. With the turn of the magnet 23, a magnetic flux density in the stators 31 changes, so that a magnetic flux density passing through the magnetoelectric transducing element 32 changes. In turn, the magnetoelectric transducing element 32 produces an electric signal proportional to the magnetic flux density, which is output from the terminal 34 to an external device.

A rotational angle of the magnet 23 (rotary shaft 22) is determined on the basis of the electric signal. To maintain the linearity in the characteristic, as shown in FIG. 11, it is preferable to range the rotational angles of the magnet 23 on both sides of 180°. Practically, the most preferable range of the rotational angle of the magnet is within 180±50°. By so ranged, a vertical movement of the float 25 may be detected highly accurately.

It should be understood that the present invention is not limited to the embodiment mentioned above, but may variously be modified, altered and changed within the true spirits and scope of the invention. Further, the materials, shapes, sizes, numerical values, forms, numbers, locations and others of the constituent components in the embodiment mentioned above are optionally selected if the technical results from use of those so selected fall within the invention.

It is evident that the non-contact type liquid level sensor of the invention is applicable to not only the vehicle fuel tank but also to various liquid storing tanks in detecting a liquid level of the stored liquid.

What is claimed is:

1. A non-contact type liquid level sensor, comprising:
    a sensor housing;
    a rotary shaft, rotatably mounted on the sensor housing;
    a float, vertically movable with a change of a liquid level;
    a float arm, having a first end mounted on the float, and a second end coupled to the rotary shaft such that the rotary shaft is rotated with a vertical movement of the float;
    an annular magnet, coupled to the rotary shaft, and rotating together with the rotary shaft;
    a pair of arcuate stators, disposed in the sensor housing so as to confront an outer peripheral surface of the magnet; and
    a magnetoelectric transducing element, disposed between the first ends of the stators, for detecting a change of a magnetic flux density in the stators, which is caused by a turn of the magnet, and for converting the detected change of the magnetic flux density into an electrical signal,
    wherein second ends of the stators are spaced from each other to form a gap having an opening angle within a range from 50° to 200°.

2. The non-contact type liquid level sensor as set forth in claim 1, wherein the arc lengths of the pair of stators are different from each other.

3. The non-contact type liquid level sensor as set forth in claim 1, wherein the opening angle of the gap is within a range from 90° to 180°.

* * * * *